United States Patent
Wherley et al.

(10) Patent No.: US 6,688,100 B1
(45) Date of Patent: Feb. 10, 2004

(54) COMBUSTION CHAMBER HAVING A MULTIPLE-PIECE LINER AND ASSOCIATED ASSEMBLY METHOD

(75) Inventors: Brian Leigh Wherley, Chatsworth, CA (US); Steven C. Fisher, Simi Valley, CA (US); Amardeep Litt, Pomona, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/195,977

(22) Filed: Jul. 16, 2002

(51) Int. Cl.$^7$ ................................................. F02K 9/00
(52) U.S. Cl. ..................................... 60/257; 29/890.01
(58) Field of Search ........................... 60/257; 29/890.01

(56) References Cited

U.S. PATENT DOCUMENTS

| | | | | | |
|---|---|---|---|---|---|
| 3,127,667 | A | * | 4/1964 | Tumavicus | ............... 29/890.01 |
| 4,942,653 | A | * | 7/1990 | Hawkinson | ............... 29/890.01 |
| 5,226,598 | A | | 7/1993 | Woehrl | |
| 5,386,628 | A | | 2/1995 | Hartman et al. | |
| 5,501,011 | A | | 3/1996 | Pellet | |
| 5,613,299 | A | | 3/1997 | Ring et al. | |
| 5,701,670 | A | | 12/1997 | Fisher et al. | |
| 6,021,570 | A | | 2/2000 | Lockyer et al. | |
| 6,079,101 | A | | 6/2000 | Kreiner et al. | |
| 6,107,596 | A | * | 8/2000 | Semenov et al. | ...... 219/121.14 |
| 6,134,782 | A | * | 10/2000 | Wright | ..................... 29/890.01 |
| 6,442,931 | B1 | * | 9/2002 | Vasin et al. | ................... 60/257 |

* cited by examiner

Primary Examiner—Ehud Gartenberg
(74) Attorney, Agent, or Firm—Alston & Bird LLP

(57) ABSTRACT

A combustion apparatus including a structural jacket, a forward liner, and an aft liner, and an associated method of constructing the same are provided. The structural jacket defines a passage including a first end, a second end, and a neck. The neck is positioned between and separates the first and second ends of the passage. The forward liner is positioned within the first end of the passage and has a throat fitted within the neck of the passage. The aft liner is positioned within the second end of the passage and has an upstream potion abutting the throat of the forward liner. The forward and aft liners are brazed together, and are bonded to the passage of the structural jacket, to form a longitudinal combustion chamber so that combustion of the propellant is contained and directed through the combustion chamber from the forward liner to the aft liner.

44 Claims, 10 Drawing Sheets

COMBUSTION CHAMBER HAVING A MULTIPLE-PIECE LINER AND ASSOCIATED ASSEMBLY METHOD

FIELD OF THE INVENTION

This invention relates to the field of rocket engine combustion chambers and more particularly relates to combustion chambers having liners supported by jackets and methods of making the same.

BACKGROUND OF THE INVENTION

The function of a rocket engine main combustion chamber is to contain the combustion process, accelerate the combustion products therefrom to a high velocity and exhaust the combustion products to create thrust. The combustion process occurs at very high temperatures typically at 5,000 to 6,000° F. and at high pressures of 1,000 to 4,000 psi. Therefore, it is desirable for the combustion chamber to have a combination of structural strength and an ability to efficiently dissipate heat.

Generally, materials that have thermal conductive properties sufficiently high enough to dissipate the heat of combustion, such as copper, do not possess the structural strength to withstand the pressure of combustion. Therefore, combustion chambers are typically constructed of a combination of materials possessing good thermal conductivity and high structural strength.

Combustion chambers are often constructed of a structurally strong outer shell of steel and a thermally conductive inner liner of copper, or copper alloy. A manifold having coolant channels is defined between the outer shell and the inner liner. The manifold allows liquid coolant to be circulated throughout the combustion chamber for additional heat dissipation. The inner surface of the liner defines a Venturi nozzle in which subsonic combustion gasses are accelerated to supersonic speeds before exiting the combustion chamber. Manufacturing such combustion chambers is typically difficult due to the complex hourglass-shape of the Venturi nozzle and the manifold. Such manufacturing difficulties are further compounded by the use different materials for the outer shell and inner liner.

In one method, the combustion chamber is serially constructed by building up a structural steel jacket around a monolithic inner liner of copper, or copper alloy. The liner is constructed from a roughly cylindrical copper shell which is worked into the Venturi shape including a neck and a pair of flared (bell-shaped) ends to promote combustion, as described above. Wax is applied to the outer surface of the copper shell in a desired configuration for the coolant channels and nickel plating is applied to the wax. After the nickel plating is applied, the liner is completed by melting the wax to leave a network of empty coolant channels defined between the nickel plating and the cooper shell. Several individual steel plates are then welded together in a conforming fit around the liner so as to form an outer structural jacket.

Advantageously, the serially constructed liner has high thermal conductive properties and the jacket provides sufficient strength to withstand the pressures generated during the combustion process. The coolant channels allow liquid coolant to be dispersed through the liner during combustion to remove heat from the combustion chamber. However, the number of welds and other labor-intensive activities required to form the structural jacket from the steel plates increases the cost of constructing the combustion chamber.

Further, the serial process of building the combustion chamber is prone to failure because a single mistake in one of the steps will result in scrapping of the entire piece. This is especially costly as the combustion chamber nears completion and a significant amount of labor and materials have been invested in the production process.

Another method of manufacturing a combustion chamber is disclosed in U.S. Pat. No. 5,701,670 to Fisher et al ("Fisher"). Fisher discloses a method of making a rocket engine combustion chamber that uses three basic components including a structural jacket, a monolithic coolant liner, and a plurality of throat support sections. The liner is a copper shell machined into the Venturi shape and includes coolant channels preformed on its outer surface. The throat support sections are fabricated and assembled around the indentation created by the tapered neck of the combustion chamber liner. The structural jacket is a heavy cast metal cylinder defining a cylindrical opening.

The throat support/liner subassembly is installed into the cylindrical opening of the structural jacket using a shrink-fit process. The shrink-fit process involves chilling the throat support/liner subassembly to a cryogenic temperature and heating the structural jacket. Heating of the structural jacket and cooling of the support/liner subassembly increases the clearance within the jacket. This increase in clearance allows insertion of the throat support/chamber liner subassembly into the structural jacket. The entire combustion chamber assembly is then subjected to a hot-isostatic pressure (HIP) bonding process. The HIP bonding process includes heating and pressurizing the entire assembly until the copper shell softens and adheres to the inner surfaces of the adjacent throat supports or the structural jacket.

The combustion chamber disclosed in Fisher has the advantage of lower cost due to a less labor-intensive construction and non-serial construction that is more forgiving of mistakes. However, in order to provide sufficient clearance to accept the throat support/liner subassembly, the structural jacket must be roughly cylindrical. The cylindrical jacket is much heavier than the jacket used in serial construction which can be more closely fit to the Venturi shape of the liner. Further, the shape difference between the cylindrical passage of the jacket and the liner requires the use of the thick and heavy throat supports. These throat supports must be heavy and strong to resist the increased pressures that occur during the HIP bonding process. The increased weight of such a combustion chamber has the effect of reducing the payload of the rocket.

Therefore, it would be advantageous to provide a relatively easy, inexpensive method of making a combustion chamber that still has sufficient structural integrity to withstand the heat and pressure of combustion. It would also be advantageous if the combustion chamber were relatively light so as to minimize its impact on the payload capacity of the rocket.

SUMMARY OF THE INVENTION

The present invention addresses the above needs and achieves other advantages by providing a combustion apparatus for containing and directing the combustion of a propellant that includes a structural jacket defining a contoured passage having a forward liner positioned within a first end of the passage and an aft liner positioned within a second end of a passage. Advantageously, a liner joint between the forward and aft liners is positioned downstream of a throat of the forward liner where the combustion gasses have a considerably lower heat flux. In addition, the contoured passage of the structural jacket eliminates the need for throat supports which reduces the weight of the combustion chamber and the complexity of assembly of the combustion chamber.

In one embodiment, the present invention includes a combustion assembly for containing and directing combustion of a propellant. The combustion assembly includes a structural jacket defining a passage including a first end, a second end and a neck. The neck is positioned between and separates the first and second ends of the passage. A forward liner is configured to fit with the first end of the passage and includes a throat and a downstream portion. The throat is upstream of the downstream portion and is configured to fit within the neck of the passage. Configured to fit within the second end of the passage is an aft liner. The aft liner includes an upstream portion configured to abut the downstream portion of the forward liner so as to form a liner joint. When fit into the structural jacket, the forward and aft liners cooperate to form a longitudinal combustion chamber so that combustion of the propellant is contained and directed through the combustion chamber from the forward liner to the aft liner.

In another aspect, each of the upstream and downstream portions includes a joining flange, wherein the joining flanges are configured to abut each other in an overlapping relationship. Each of the upstream and downstream portions may also include a beveled portion partially formed by the flanges and configured to abut each other in an overlapping relationship so as to form the liner joint. The flanges allow the liners to be secured to each other during a bonding process that seals the liners to the structural jacket. The excess portions of the flanges may be removed after bonding for a smooth, contiguous liner surface. One of the flanges may also include a HIP assist groove that decreases the contact area between the flanges which increases the pressure at the interface between the flanges during the bonding process.

In yet another aspect, the neck of the passage may be over-bored to allow passage of the joining flange of the forward liner. Optionally, the assembly can also include a filler ring configured to fit around the throat of the forward liner. The filler ring forms a close fit between the throat and the neck after insertion of the forward liner into the jacket. Preferably, the filler ring is constructed of a brazeable material allowing it to be brazed into place between the throat and the neck.

In still another aspect, one of the joining flanges includes a pin and the other one of the joining flanges defines an index hole configured to receive the pin. The index hole has a width equal to a diameter of the pin and a depth at least as great as a length of the pin. The depth of the index hole allows the flanges to come into full contact. Use of the pin and index hole ensures that coolant channels on the surface of the liners are properly aligned.

The combustion chamber apparatus of the present invention has several advantages. The use of a two or more liner sections in lieu of a single piece liner allows larger combustion chambers to be constructed from standard sized liner shells, billets or casings. The need for throat supports is eliminated by the contoured shape of the structural jacket. Eliminating the throat supports has several advantages, including reduction in the overall weight of the combustion chamber, elimination of the occurrence of coolant leakage between the throat supports and simplification of the assembly process. Further, the wall structure of the jacket may be thinner, and hence lighter, due to the conforming shape of the jacket passage and the ability to directly apply pressure during the HIP bonding process to the inner wall of the jacket through the hole defined in the outer wall if a throat support cylinder is used. Optionally, some chambers can be constructed without an outer wall, or the outer wall may be removed entirely. A lighter wall structure, combined with elimination of the heavy throat supports, results in an overall decrease in the weight of the combustion chamber and a concomitant increase in the payload of the rocket.

BRIEF DESCRIPTION OF THE DRAWINGS

Figure 1:
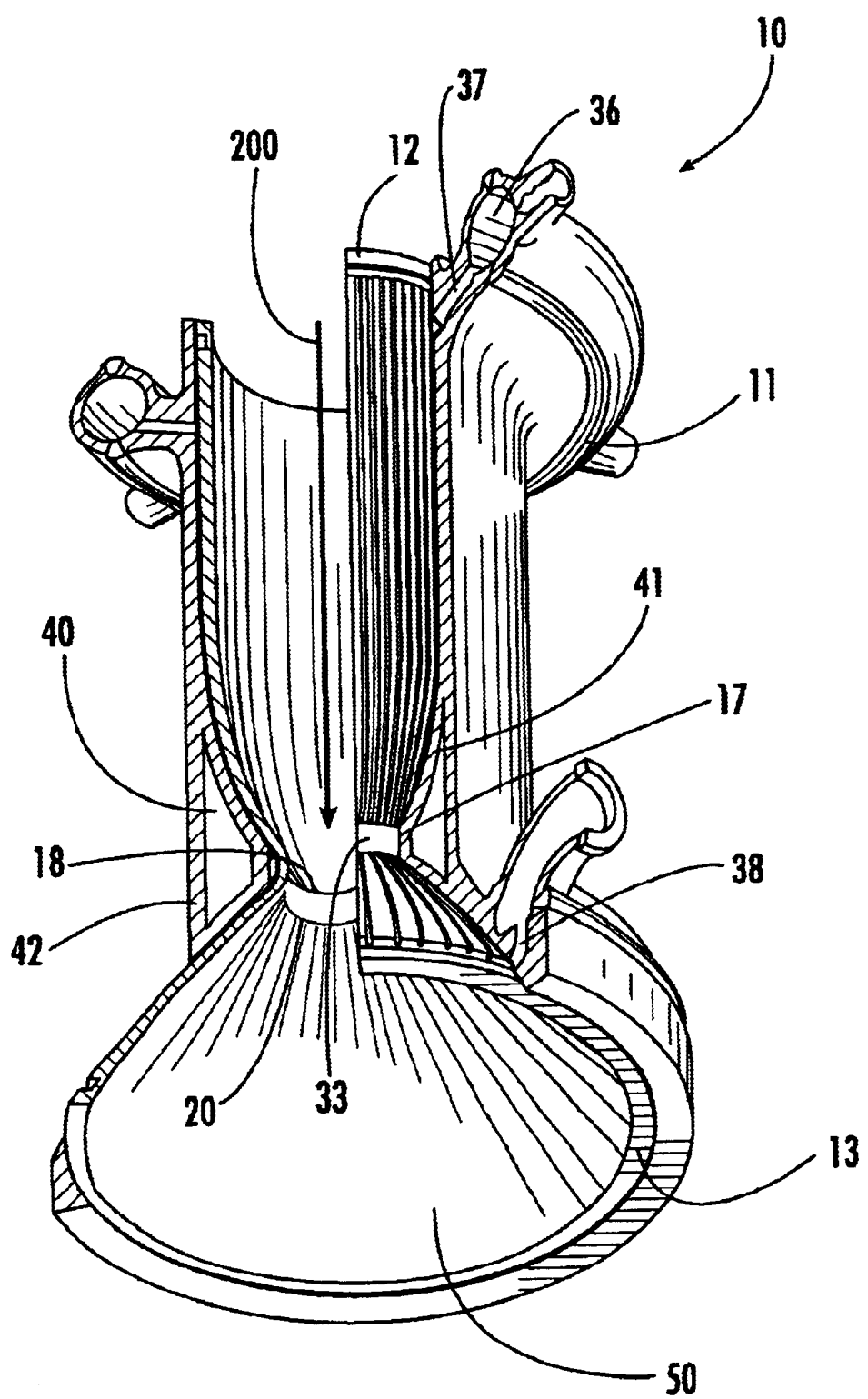
Figure 2:
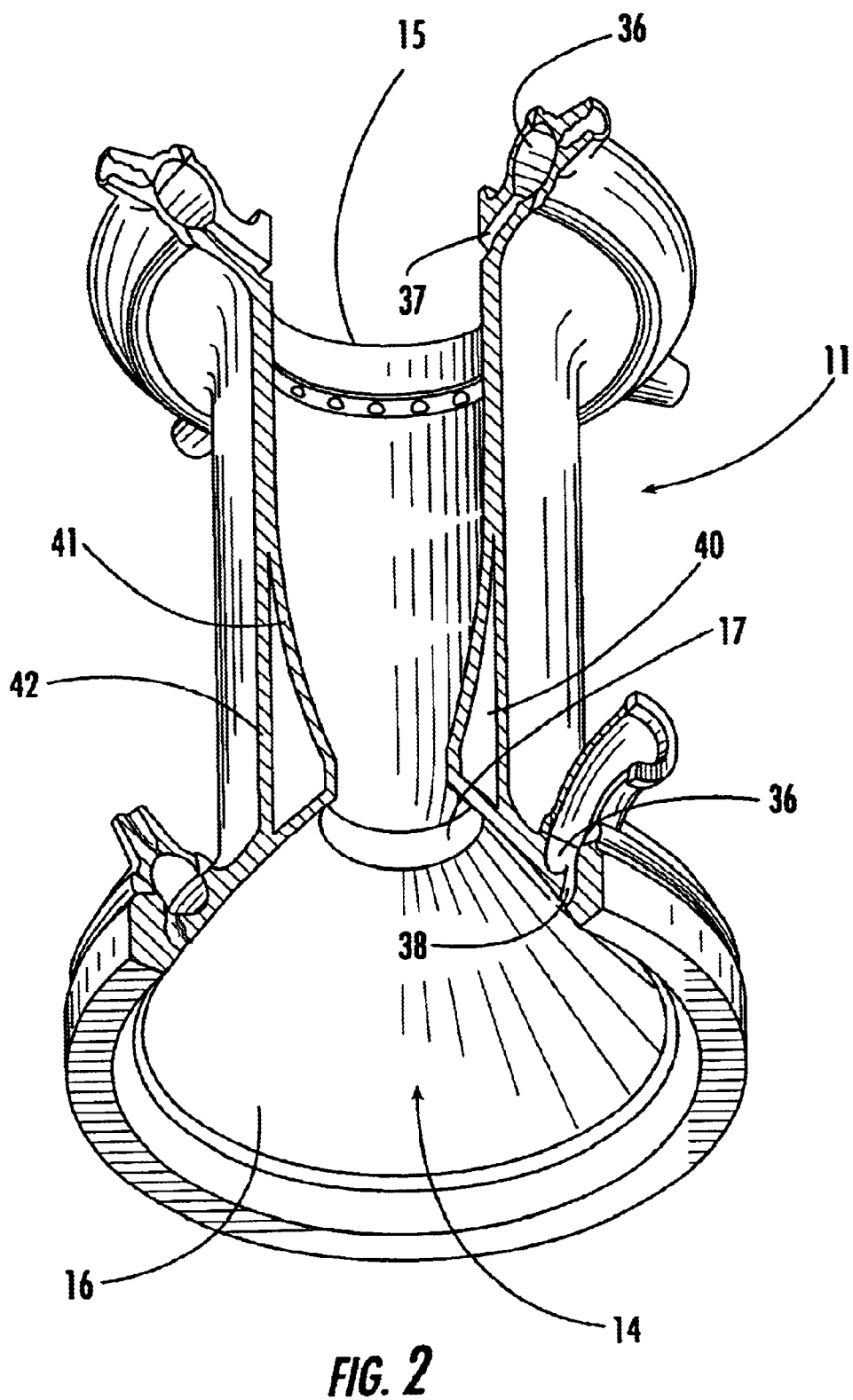
Figure 3:
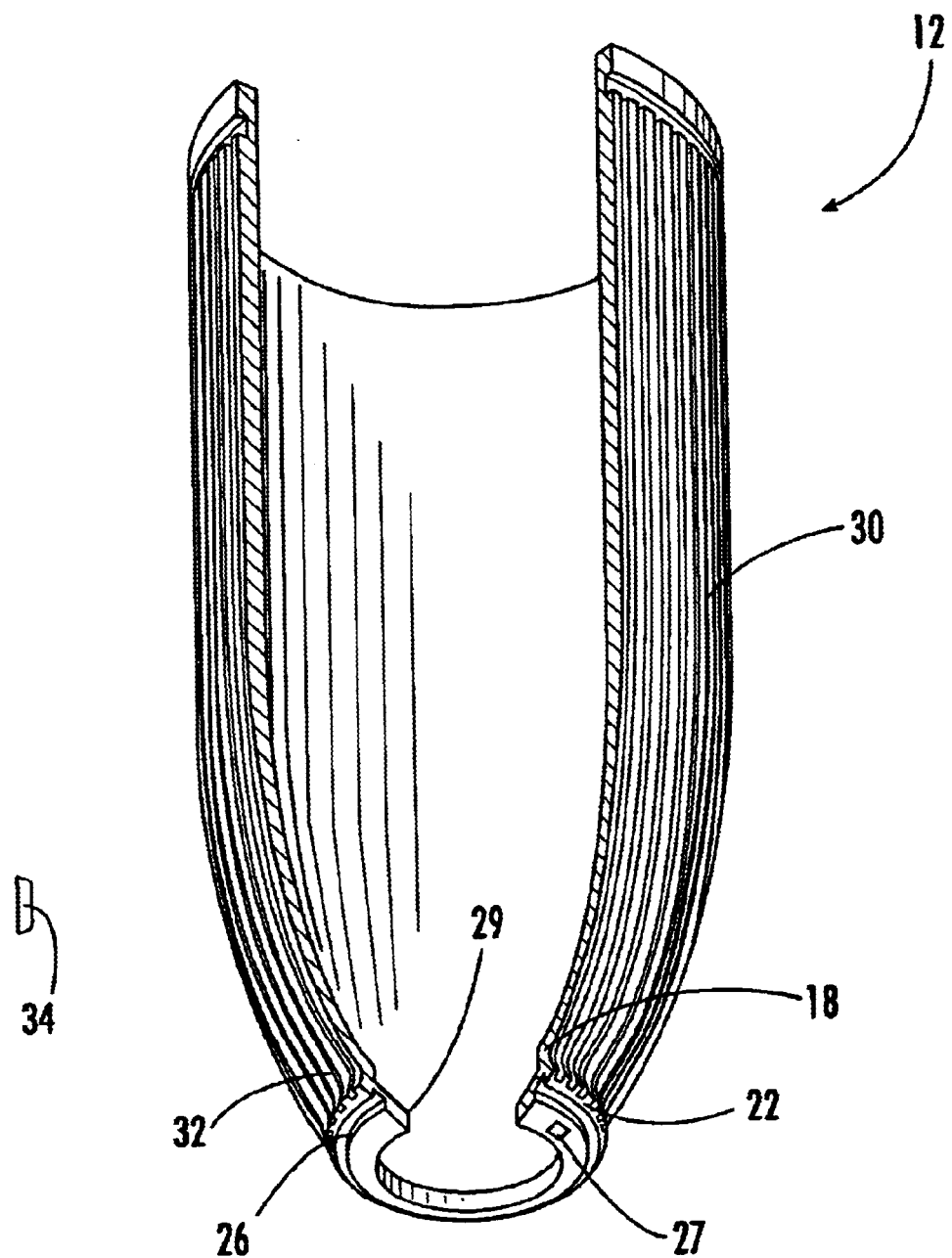
Figure 4:
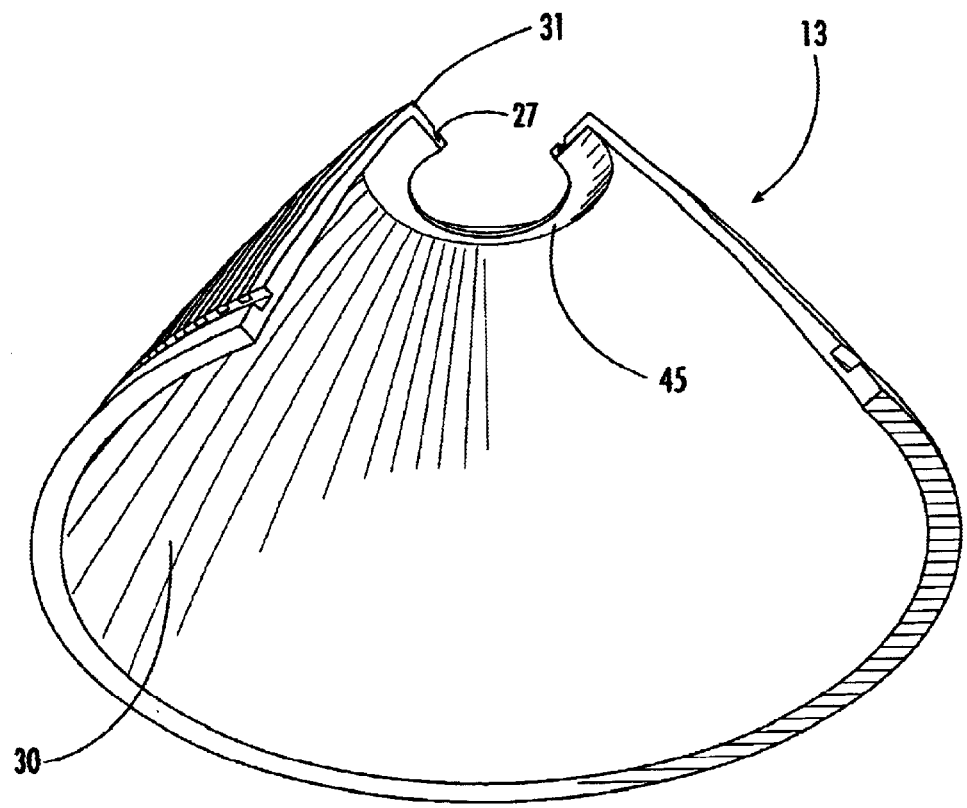
Figure 5:
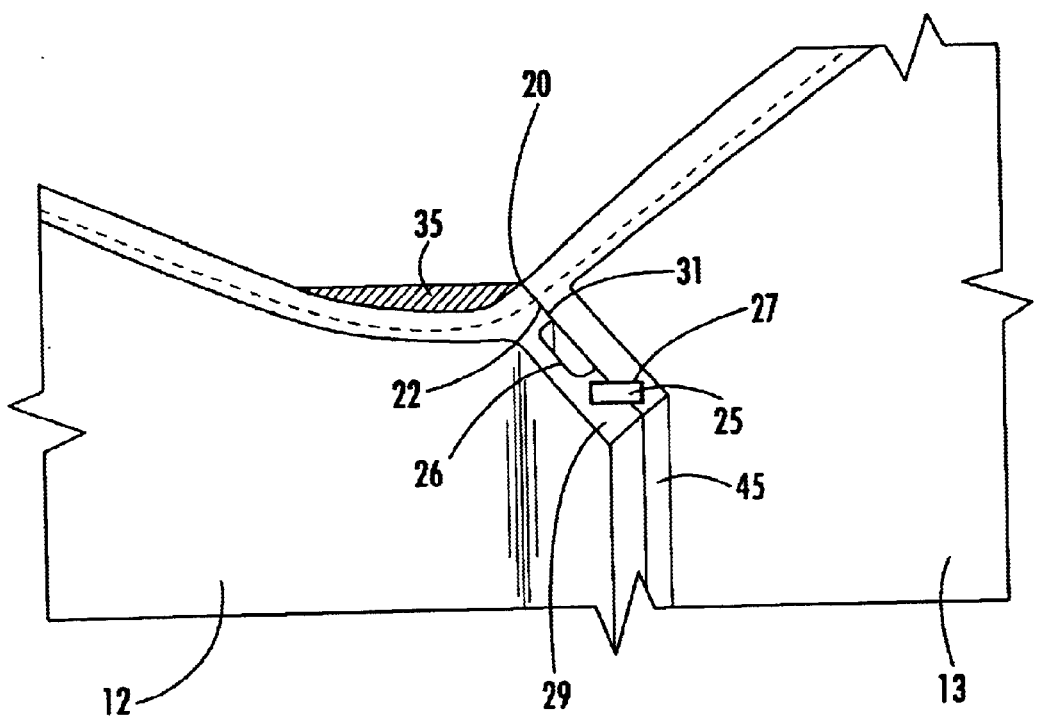
Figure 6:
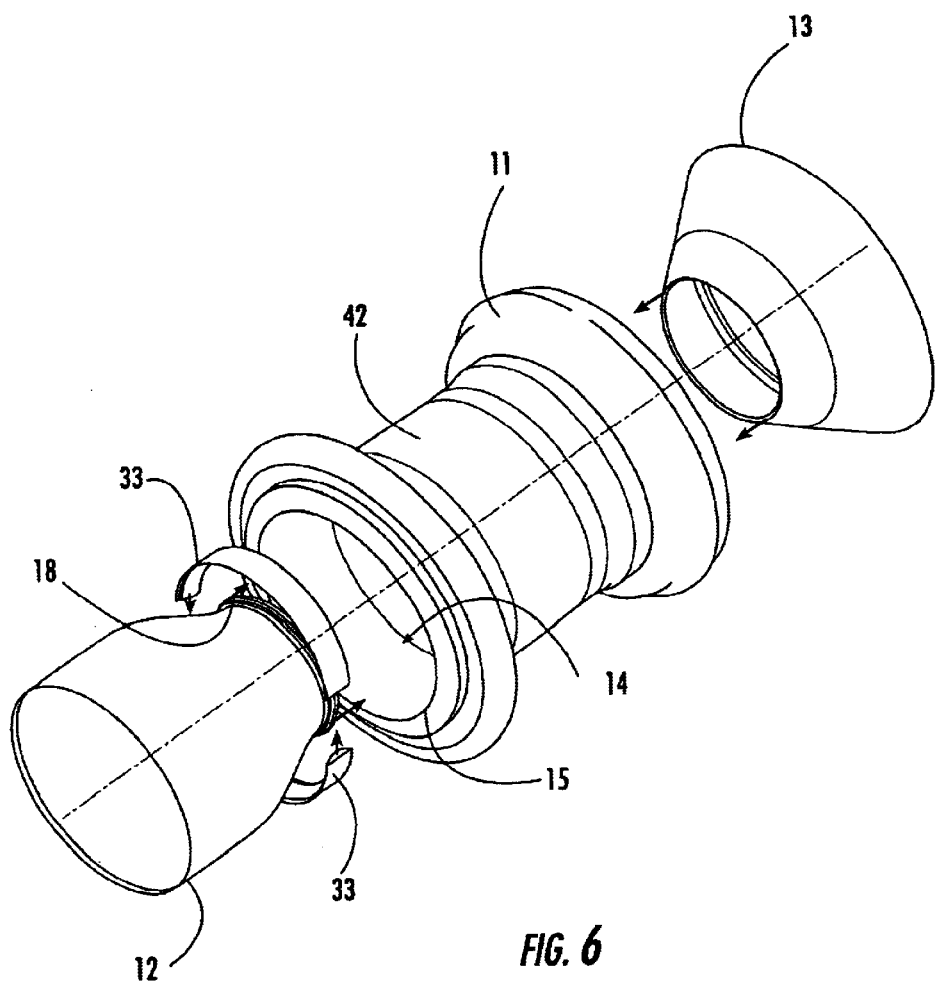
Figure 7:
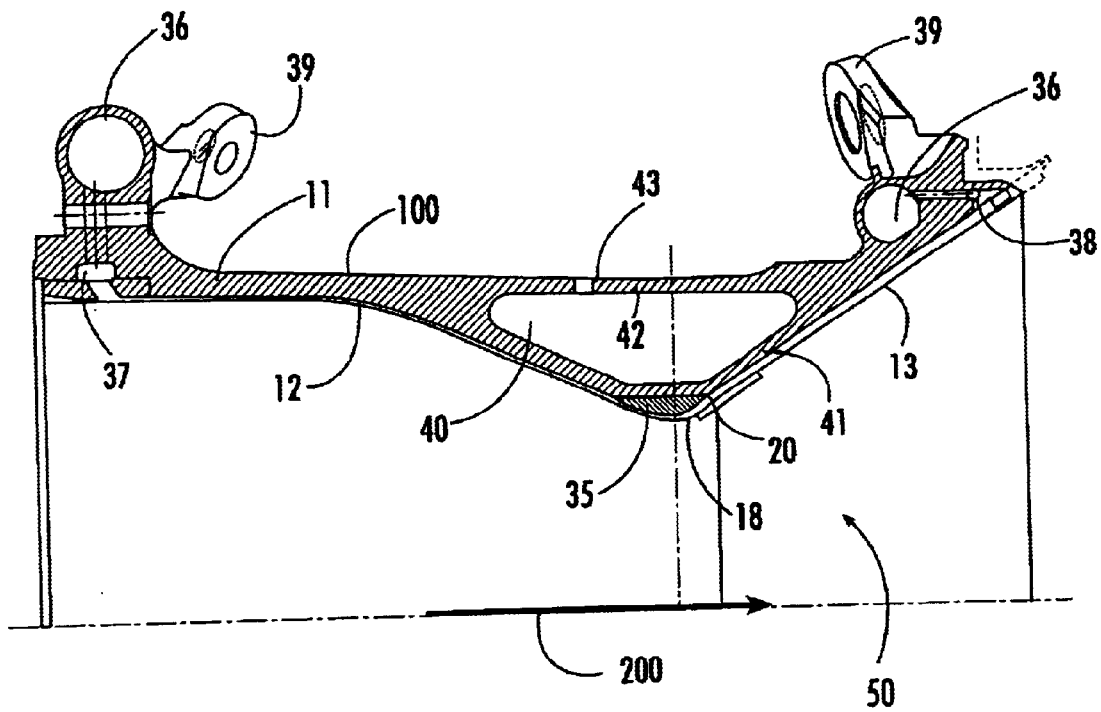
Figure 8:
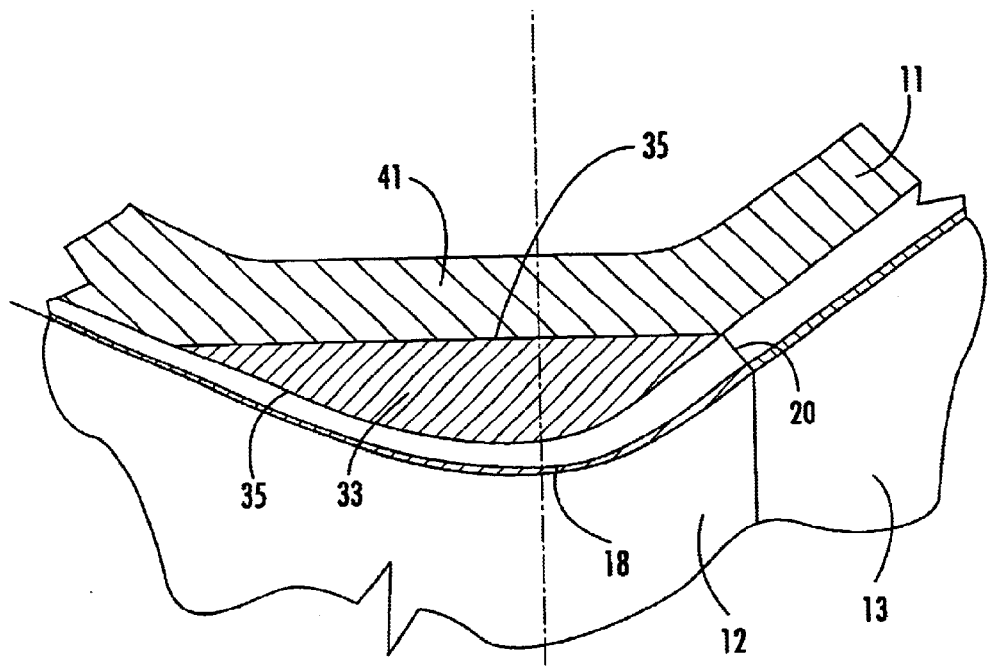
Figure 9:
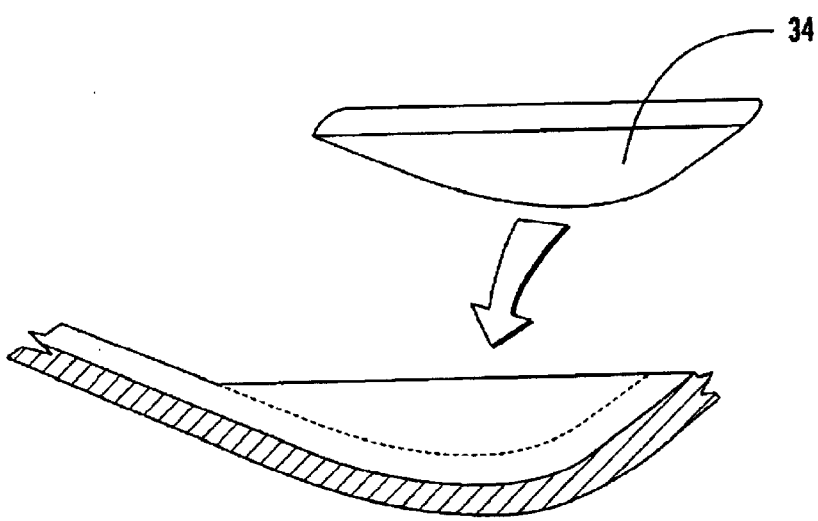
Figure 10:
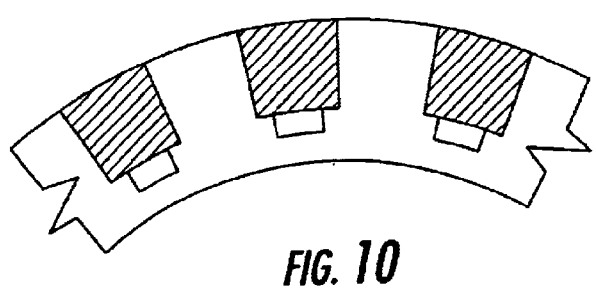
Figure 11:
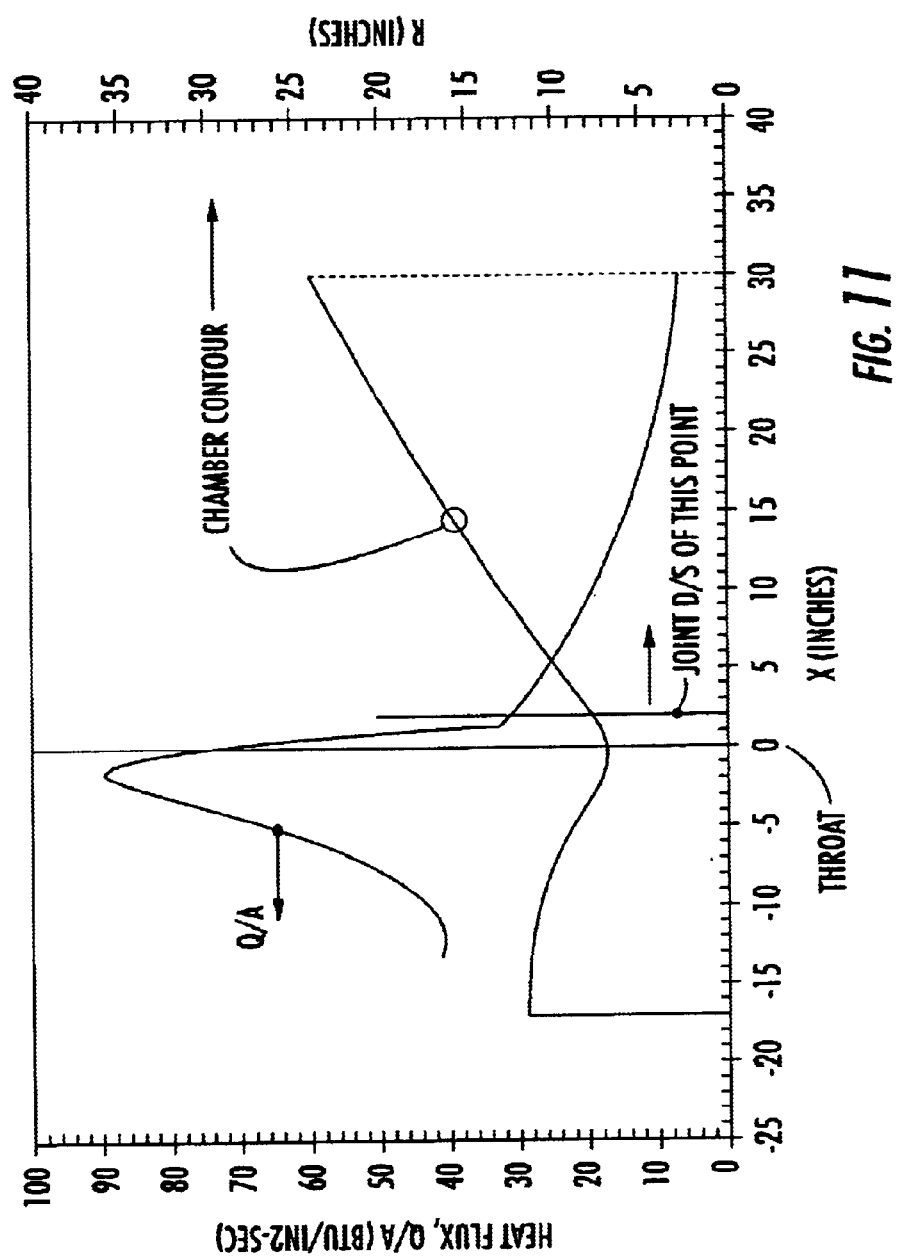
Figure 12:
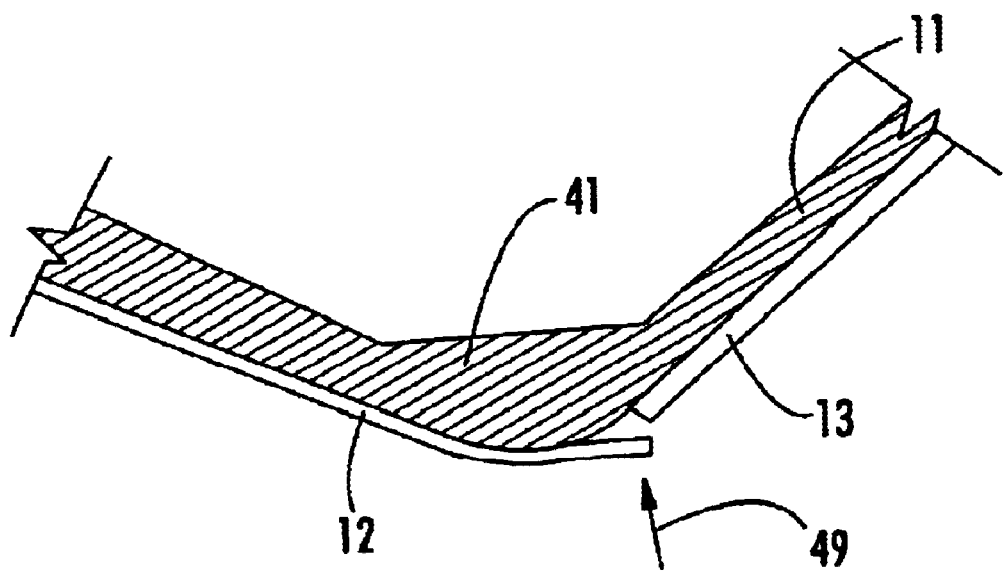

Having thus described the invention in general terms, reference will now be made to the accompanying drawings, which are not necessarily drawn to scale, and wherein:

FIG. 1 is a partial sectional view of an assembled combustion chamber apparatus of one embodiment of the present invention;

FIG. 2 is a partial sectional view of a jacket of the combustion chamber apparatus shown in FIG. 1;

FIG. 3 is a partial sectional view of a forward liner of the combustion chamber apparatus shown in FIG. 1;

FIG. 4 is a partial sectional view of an aft liner of the combustion chamber apparatus shown in FIG. 1;

FIG. 5 is an enlarged sectional view of forward and aft flanges aligned by the insertion of a pin into a corresponding hole in another aspect of the present invention;

FIG. 6 is an exploded view of a combustion chamber apparatus of another embodiment of the present invention including a two-piece filler ring for attachment about a throat of the forward liner;

FIG. 7 is a sectional view of the assembled combustion chamber apparatus shown in FIG. 6;

FIG. 8 is an enlarged sectional view of the two-piece filler ring of FIG. 6 after completion of the bonding process;

FIG. 9 is a sectional view of insertion of a filler piece into a widened coolant slot on the forward liner of another embodiment of the present invention;

FIG. 10 is a sectional view of several of the filler pieces of FIG. 9 inserted into respective coolant slots on the forward liner of another embodiment of the present invention;

FIG. 11 is a diagram of the heat flux produced by combustion relative to its axial position in a combustion chamber of another embodiment; and FIG. 12 is a sectional view of the downstream end of a forward liner of another embodiment of the present invention being formed to the inner passage of a jacket of yet another embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

An assembled combustion chamber apparatus 10 according to one embodiment of the present invention is shown in FIG. 1 and generally includes a forward liner 12 and an aft liner 13 that are positioned within a contoured jacket passage 14 defined by a structural jacket 11. Generally, the two liners 12, 13 are inserted into respective first and second ends, 15 and 16, of the contoured jacket passage 14 and are adhered to the inner surface of the jacket 11 by a hot isostatic pressure (HIP) bonding process. The two liners 12, 13 define a Venturi-shaped combustion chamber passage 50 in which combustion occurs and is directed in the direction of arrow 200 to produce thrust. However, the present invention should not be considered limited to the combustion chamber geometry illustrated herein. For instance, the general desired geometry of the chamber passage, and therefore the geometry of the liners and the jacket, depend upon several factors, such as the characteristics of the combustion process and the type of launch vehicle or aerospace vehicle.

Preferably, the forward liner 12 and the aft liner 13 are constructed of a material having high thermal conductivity, long low-cycle fatigue life, high yield strength, resistance to creep and stress rupture, oxidation resistance, and compatibility with coolants and fuels. Further, the liners should be resistant to a range of temperatures, preferably from −400 to 1200° F. or even hotter. The materials should also exhibit microstructural stability through diverse thermal and mechanical processing procedures, compatibility with bonding processes and good adherence of oxidation resistant coatings. Some preferred materials include copper based alloys, superalloy alloys, nickel and gamma Ti alumindes.

More specific examples include NARloy-Z type copper alloy (Cu—Ag—Zr), GRCop-84 and GRCop-42 (Cu—Nb—Cr), copper chromium (Cu—Cr), and oxygen-free high thermal conductivity copper (OFHC). For instance, cylinders of centrifugal cast, forged and spun formed NARloy-Z alloy can be further worked and machined into the desired liner shapes, such as the forward and aft liners shown in FIGS. 3 and 4. As the stock alloy centrifugal castings are limited in their size, and malleability, the multiple-piece liners of the present invention can be much larger than conventional single-piece liners. Therefore, very large combustion chambers could be constructed with three, four, or even more, separate liner pieces bonded together and to the structural jacket 11. It shall be recognized that although copper alloys are preferred, other thermally conductive materials can be used to construct the liners of the present invention.

The forward and aft liners 12 and 13 are constructed to maximize heat dissipation from the combustion process. For instance, the liners preferably include a plurality of coolant channels 30 (or slots) defined on their outside surfaces. As shown in FIGS. 3 and 4, the coolant channels are corrugations that extend along the length of the liners 12, 13 in the direction of combustion flow. The walls that define the channels aid in heat transfer into the circulated coolant by serving as cooling fins and also support coolant pressure loads. Preferably, the thickness of the hot gas wall of the liners (the portion of the liner wall between the coolant and the hot combustion gas) is minimized to minimize the resistance to heat flow through the walls of the liners and into the coolant channels 30.

The liners 12, 13 are each shaped to comprise roughly one half of the Venturi, or hourglass, shaped combustion chamber passage 50. The forward liner 12 has a cylindrical shape at the upstream end and tapers (converges) in the downstream direction, terminating at its downstream end, as shown in FIG. 3. The downstream end includes a conical, or beveled self-aligning portion 22 that tapers further as it extends in the downstream direction. The aft liner 13 has a conical, or bell, shape that flares (diverges) in the downstream direction and includes an inwardly directed, beveled portion 31 at its upstream end, as shown in FIG. 4. The beveled portion 31 is angled in the downstream direction so as to be congruent with the beveled portion 22 of the forward liner 12, allowing the beveled portions to abut when both liners 12, 13 are installed in the jacket 11 to form an interface, or liner joint 20.

Typically, the downstream end of the forward liner 12 additionally includes a joining flange 29 that extends radially inwards to define part of the beveled portion 22. The upstream end of the aft liner 13 also typically includes a joining flange 45 that extends radially inwards to define part of its beveled portion 31. The joining flanges 29, 45 are used to temporarily join the two liners during HIP bonding, and are then machined away for a smooth inner liner surface. The use of the joining flanges 29, 45 advantageously can eliminate the need for insertion of a mandrel into the ends of the liners 12, 13 to hold the liners in place against each other and the structural jacket 11 during the HIP process.

Optionally, either of the joining flanges may further define a HIP assist groove 26 that has the shape of a circular channel extending circumferentially around the joining flange. The HIP assist groove 26 increases the pressure between the abutting surfaces of the liners 12, 13 for an improved bond. The joining flange 29 may include an alignment pin 25 configured to engage an index hole 27 defined in the joining flange 45 of the aft liner 13. Advantageously, the alignment pin 25 ensures that the coolant channels of the liners are properly aligned before the HIP process begins. The positioning and number of alignment pins is not limited to the above description and could be varied depending upon the size and shape of the liners, the size and shape of the flanges, and other factors, so as to ensure a correct fit between the liners. For instance, the alignment pin 25 could be a separate member, or could originate from the beveled portion 31 of the aft liner 13.

Generally, the structural jacket 11 has an annular wall structure 100 comprised of a structurally strong material so as to be able to withstand the forces of combustion, to transmit thrust loads and to support the liners 12, 13. Material selection for the structural jackets is usually driven by the engine requirements and the expected propellant combinations. The structural jacket may be constructed of materials such as Iconnel 718 or 625 (high strength), JBK 75, 300 series CRES materials (lower cost), high-strength aluminum and silican nitride ceramics. Generally, low weight and high strength materials are preferred for reusable combustion chambers despite their increased cost. Compatibility with the coolant and/or fuel are also important. Hydrogen may embrittle some of the materials such as Iconnel 718, leading to a substitution of JBK 75. Further, the jacket and liner materials should have similar thermal expansion characteristics to facilitate successful HIP bonding. Externally, the jacket is roughly cylindrical with the pair of spaced, outwardly flared first and second ends 15, 16 as shown in FIG. 2. A manifold tube 36 defines the outer circumference of each of the flared ends as shown in FIGS. 2 and 7. Each manifold tube 36 may include a plurality of inlets 37 and outlets 38.

When the combustion chamber 10 is assembled, the manifold tubes and the network of coolant channels 30 cooperate to form a manifold for the flowing coolant to remove the heat generated during the combustion process. At the downstream end, in a reverse heat exchanger mode, the coolant is fed into the inlets 37, flows in through the manifold tube 36 downstream, out of the outlets 38 and into the channels defined on the outside of the aft liner 13. The heat from combustion flows through the walls of the liner and into the coolant as pressure drives the coolant through the channels on the outside of the forward liner 12. The coolant collects further heat and flows through the outlets 38, into the upstream manifold tube 36, and out through the upstream inlets 37. Alternatively, the coolant could flow in through the upstream manifold tube 36, and out through the downstream manifold tube, in the same direction as the combustion.

The passage 14 of the structural jacket 11 has an internal geometry that matches desired outside contour of the two combustion chamber liners 12 and 13. The permissible initial clearance between the chamber liners and the passage is not critical for successful bonding. The HIP bonding temperatures and pressures will increase the softness of the liners and will force the liners to adhere to the passage, as described below. The first, upstream end 15 of the of the jacket passage 14 is cylindrical in shape, tapering in the downstream direction, roughly congruent with the shape of the forward liner 12. Similarly, the second, downstream end 16 has a flared, conical shape that is roughly congruent with the shape of the aft liner 13. Advantageously, even if the liners are not closely congruent to the passage 14, the pressure and heat of the HIP process will force them into intimate contact with the structural jacket.

The first and second ends 15, 16 of the jacket passage 14 are separated by the neck 17 of the passage. Although the wall structure 100 may be solid, the wall structure preferably includes an inner wall 41 that defines the inwardly tapering portions of the jacket passage 14, and an outer wall 42. The inner and outer walls together define an annular cavity 40 that has a triangular cross-sectional shape, shown in FIG. 7. The annular cavity 40 may optionally be vented with a hole 43 defined in outer wall 42 that allows passage of the pressure created during HIP bonding into the annular cavity. In this manner, the outer wall 42 need not withstand the pressure forces of HIP bonding and can be much thinner, and lighter, than the outer wall of the cylindrical jacket of the prior art. Restated, if the cavity 40 was sealed it would have to be much heavier so as to resist being crushed by the increased heat and pressure. Instead, the outer wall may be sized to withstand the typically much lower flight forces, or may optionally be machined away for weight reduction, or not included at all on the structural jacket. The combination of the thinner walls, the lack of throat supports and the empty cavity 40 result in a significant weight reduction of the combustion chamber 10.

In one embodiment, the liner joint 20 between the forward liner 12 and the aft liner 13 is positioned within the neck 17 of the jacket passage 14. In another, more preferred embodiment of the present invention, the neck 17 of the structural jacket 11 may be over-bored to permit placement of the liner joint 20 downstream of a throat 18, as shown in FIGS. 7 and 8. In such an embodiment, the narrowed portion, or throat 18, of the forward liner 12 is subjacent the beveled portion 22 and the forward liner actually diverges as it extends past the throat. Upon assembly, the throat 18 is positioned in the neck 17 of the jacket passage 14.

The space between the throat 18 and the over-bored neck 17 can be accommodated by using filler pieces 34 inserted into the coolant slots 32 defined at the throat, as shown in FIG. 9. Each of the coolant slots 32 is prepared to accept the filler piece by locally machining the slot so as to widen a top portion of the preexisting coolant channel geometry, as best shown in FIG. 10. Insertion of each of the filler pieces 34 into the widened coolant channel reduces the height of the coolant channel. The reduced coolant channel height reduces the cross-section area of the coolant channel and thereby maintains a relatively high velocity of the coolant at the throat. In addition, capture of the filler pieces allows the forward liner 12 to be inserted into the structural jacket 11 without having to braze the filler pieces to the liner before bonding of the entire apparatus 10.

Another technique for accommodating the over-bored neck 17 of a full-sized booster engine is illustrated in FIG. 6. A two-piece ring 33 is slipped over the joining flange 29 of the forward liner and around the throat 18. Optionally, the pieces of the ring 33 may be fastened together at their respective ends just long enough for preparation of the assembly of the combustion apparatus 10. For instance, the pieces of the ring 33 may be fastened together using a tooling pin or a screw. However, fastening is not required once the forward liner is inserted into the jacket as the jacket holds the ring 33 in place prior to bonding. The two-piece filler ring preserves the desired coolant channel geometry in the final assembly, as shown in FIGS. 7 and 8. A protective coating, such as gold, may be placed on the ring 33 to prevent oxidation and the gold and copper together may even be incorporated into a braze joint.

Another alternative is to avoid the requirement of using a filler by starting with a non-flared forward liner 12 that can be easily inserted through the neck 17 of the structural jacket passage, as shown in FIG. 12. Once the forward liner is positioned, the downstream end of the forward liner is formed or rolled outwards (in the direction of arrow 49) into a flare until it abuts the upstream edge of the aft liner to form the joint 20.

The liner joint 20 is positioned downstream so as to reduce the amount of heat flux passing through the joint, thereby maintaining its integrity. More particularly, placement of the liner joint 20 downstream of the throat 18 puts the liner joint in a much lower heat flux region of expanding combustion flow in the combustion chamber apparatus 10. As shown by the diagram of FIG. 11, downstream. placement lowers the maximum heat flux to which the liner joint 20 is exposed thereby reducing thermal stresses and resulting in a HIP bonded joint with high strength. The amount of heat flux peaks slightly upstream of the throat of the forward liner and then drops steeply in the downstream direction. In the example shown, the forward liner 12 has a length of 17 inches and the joint 20 is positioned 2 inches, or approximately 12% of the total length of the forward liner, downstream of the throat. Preferably, the joint is positioned about 5 to 15% of the total length of the forward liner downstream of the throat 18.

During assembly of the combustion chamber 10, the two-piece filler ring 33 is held together in a sleeved position at the throat 18, subjacent the joining flange 29 of the forward liner 12. The forward liner 12 is inserted into the first end 15 of the structural jacket 11 and plating and/or a braze alloy 35 is applied to form a structural bond between the forward liner 12, the two-piece filler ring 33 and the structural jacket 11. FIG. 8 illustrates the braze joint 35 formed between the liner 12, the ring 33, and the structural jacket 11. The upstream end of the forward liner 12 may also be sealed by brazing or welding 48 to the jacket 11.

The aft liner 13 is inserted into the second end 16 of the structural jacket and advanced toward the first liner and the neck 17 of the jacket passage 14. Advancement is halted when the beveled portion 31 of the aft liner 13 abuts the beveled portion 22 of the forward liner 12. The positions of the liners are adjusted until the index hole 23 defined by the beveled portion 31 receives the alignment pin 25 of the joining flange 29. Alignment of the liners ensures that the coolant slots 32 of the liners are also properly aligned. The aft liner 13's upstream end is further secured to the forward liner 12's downstream end via a braze joint seal. In addition, the downstream end of the aft liner 13 is sealed to the jacket 11. The seals at the upstream end of the forward liner 12, the downstream end of the aft liner 13 and the liners to each other, effectively form the liners into a bladder. Such an effect causes the liners to expand from the pressure of the evacuation process and thereby adhere to the inside of the jacket 11. Alternatively, a shrink-fitting process and mandrels could be employed to facilitate insertion and bonding of the liners to the structural jacket passage 14.

The assembly is then placed in the HIP bonding furnace where the temperature and pressure are increased until the liners 12, 13 soften and are forced into intimate contact with the adjacent jacket passage 14. Advantageously, the HIP bonding process eliminates any clearance between the complex shape of the passage 14 and the liners 12, 13 so as to form a contiguous combustion chamber liner. Optionally, the hole 43 may be cast, or machined, in the outer wall 42 to allow the cavity 40 to pressurize and more effectively bond the liners to the jacket. In addition, venting the cavity with the hole 43 relieves the outer wall 42 of the need to withstand the pressure of the HIP process which is typically about 200 to 500 psi.

During the HIP bonding process, the liner joint 20 between the liners 12 and 13 is sealed, as shown in FIG. 5. In particular, the presence of the HIP assist groove 26 increases the bonding pressure, and hence the quality of the bond, between the bevel 22 of the forward liner throat 18 and the beveled portion 31 of the aft liner 13. After the combustion chamber 10 has cooled, the joining flange 29 and the excess of the aft liner beveled portion 31 are machined away, leaving a smooth surface at the throat 18, as shown in FIGS. 7 and 8.

The combustion chamber apparatus 10 of the present invention has several advantages: The need for throat supports is eliminated by the contoured shape of the structural jacket 11. Eliminating the throat supports has several advantages, including reduction in the overall weight of the combustion chamber, elimination of the occurrence of coolant leakage between the throat supports and simplification of the assembly process. Further, the wall structure 100 of the jacket may be thinner, and hence lighter, due to the conforming shape of the jacket passage and the ability to directly apply pressure during the HIP bonding process to the inner wall of the jacket through the hole 43 defined in the outer wall. The use of a two or more liners in lieu of a single piece liner allows larger combustion chambers to be constructed from standard sized liner shells, billets or casings. A lighter wall structure, combined with elimination of the heavy throat supports, results in an overall decrease in the weight of the combustion chamber and a concomitant increase in the payload of the rocket.

Many modifications and other embodiments of the invention will come to mind to one skilled in the art to which this invention pertains having the benefit of the teachings presented in the foregoing descriptions and the associated drawings. For instance, the process described herein could be used to construct a chamber for holding turbofan combustion on a jet engine. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A combustion assembly for containing and directing combustion of a propellant, said combustion assembly comprising:
    a structural jacket having a passage including a first end, a second end and a neck, said neck positioned between and separating the first and second ends of the passage;
    a forward liner configured to fit within the first end of the passage and including a throat and a downstream portion wherein said throat is upstream of the downstream portion and wherein said throat defines a minimum inner diameter of the forward liner; and
    an aft liner configured to fit within the second end of the passage and including an upstream portion configured to abut the downstream portion of the forward liner so as to form a liner joint, wherein said forward and aft liners cooperate when fit into the structural jacket to form a longitudinal combustion chamber so that combustion of the propellant is contained and directed through the combustion chamber from the forward liner to the aft liner.

2. A combustion assembly according to claim 1, wherein the downstream portion of the forward liner includes a joining flange and wherein the upstream portion of the aft liner includes a joining flange, said flanges configured to abut each other in an overlapping relationship.

3. A combustion apparatus according to claim 1, wherein the downstream portion of the forward liner includes a beveled portion and wherein the upstream portion of the aft liner includes a beveled portion, said beveled portions configured to abut each other in an overlapping relationship and form the liner joint.

4. A combustion chamber assembly according to claim 3, wherein the downstream portion of the forward liner includes a joining flange at least partially defining the beveled portion of the forward liner and wherein the upstream portion of the aft liner includes a joining flange at least partially defining the beveled portion of the aft liner.

5. A combustion apparatus according to claim 4, wherein the neck of the passage is over-bored a sufficient amount to allow passage of the joining flange of the forward liner.

6. A combustion chamber assembly according to claim 5, further comprising a filler ring configured to fit around the throat of the forward liner and sized to form a close fit between the throat of the forward liner and the neck of the passage when the forward liner is fit into the structural jacket.

7. A combustion chamber assembly according to claim 6, wherein the filler ring is a two-piece ring at least partially constructed of a brazeable material.

8. A combustion chamber assembly according to claim 4, wherein one of the joining flanges includes an alignment pin and the other one of the joining flanges defines an index hole configured to receive the alignment pin.

9. A combustion chamber assembly according to claim 8, wherein the index hole has a width that is equal to a diameter of the pin and the index hole has a depth at least as great as a length of the pin, said depth of the index hole allowing the flanges to come into full contact.

10. A combustion chamber assembly according to claim 9, wherein the liners each include a plurality of coolant channels and wherein the pin and index hole are configured to align the coolant channels of the liners.

11. A combustion chamber assembly according to claim 4, wherein one of the joining flanges defines a groove configured to decrease a contact area between the beveled portions.

12. A combustion chamber assembly according to claim 5, further comprising a filler piece and wherein the throat of the forward liner defines a slot configured to receive the filler piece, said filler piece sized to form a close fit between the throat and the neck of the passage.

13. A combustion chamber assembly according to claim 1, wherein the jacket includes an inner wall defining the neck of the passage and an outer wall, said inner and outer walls defining a cavity therebetween.

14. A combustion chamber assembly according to claim 13, wherein the outer wall defines a hole.

15. A combustion chamber assembly according to claim 1, wherein the joint is positioned downstream of the throat approximately 5% to 15% of the forward liner's total length.

16. A combustion chamber assembly according to claim 1, wherein the joint is positioned downstream of the throat approximately 12% of the forward liner's total length.

17. A combustion apparatus for containing and directing combustion of a propellant, said combustion apparatus comprising:
  a structural jacket having a passage including a first end, a second end and a neck, said neck positioned between and separating the first and second ends of the passage;
  a forward liner bonded within the first end of the passage and including a throat and a downstream portion wherein said throat is upstream of the downstream portion and wherein said throat defines a minimum inner diameter of the forward liner; and
  an aft liner bonded within the second end of the passage and including an upstream portion abutting the downstream portion of the forward liner so as to form a liner joint, wherein said forward and aft liners cooperate to form a longitudinal combustion chamber so that combustion of the propellant is contained and directed through the combustion chamber from the forward liner to the aft liner.

18. A combustion apparatus according to claim 17, wherein the downstream portion of the forward liner includes a beveled portion and wherein the upstream portion of the aft liner includes a beveled portion, said beveled portions abutting each other to form the liner joint.

19. A combustion apparatus according to claim 18, wherein the neck of the passage is over-bored and the throat of the forward liner is positioned within the over-bored neck.

20. A combustion apparatus according to claim 19, wherein the throat of the forward liner is connected to the over-bored neck by a braze filler joint.

21. A combustion apparatus according to claim 20, wherein the braze joint also connects the beveled portions of the liners to each other.

22. A combustion apparatus according to claim 17, wherein the jacket includes an inner wall defining the neck of the passage and an outer wall, said inner and outer walls defining a cavity therebetween.

23. A combustion apparatus according to claim 22, wherein the outer wall defines a hole.

24. A combustion apparatus according to claim 17, wherein the joint is positioned downstream of the throat approximately 5% to 15% of the forward liner's total length.

25. A combustion chamber assembly according to claim 17, wherein the joint is positioned downstream of the throat approximately 12% of the forward liner's total length.

26. A method of assembling a combustion apparatus defining a combustion chamber passage for containing and directing combustion of a propellant, the method of assembling comprising:
  inserting a forward liner having a downstream portion into a first end of a passage of a structural jacket and fitting a throat of the forward liner into a neck of the passage, said neck positioned between the first end and a second end of the passage and said throat positioned upstream of the downstream portion;
  inserting an aft liner having an upstream portion into the second end of the passage and positioning the upstream portion of the aft liner adjacent to the downstream portion of the forward liner so as to form a liner joint downstream of the throat;
  securing the portions to each other so as to seal the liner joint and form the forward liner and aft liner into a contiguous combustion chamber liner; and
  bonding the contiguous combustion chamber liner to the structural jacket.

27. A method of assembling according to claim 26, wherein securing the portions includes brazing the portions together.

28. A method of assembling according to claim 26, wherein positioning the upstream portion adjacent the downstream portion includes positioning a joining flange of the upstream portion adjacent a joining flange of the downstream portion.

29. A method of assembling according to claim 28, wherein positioning the upstream portion adjacent the downstream portion further includes aligning the liners by inserting a pin of one of the joining flanges into an index hole defined in the other one of the joining flanges.

30. A method of assembling according to claim 29, wherein securing the portions includes brazing the joining flanges together.

31. A method of assembling according to claim 30, further comprising smoothing the combustion chamber passage by removing excess portions of the flanges.

32. A method of assembling according to claim 26, further comprising over-boring the neck of the passage before inserting the forward liner.

33. A method of assembling according to claim 29, further comprising positioning a filler ring about the throat of the forward liner before inserting the forward liner and wherein fitting the throat includes fitting the filler ring and throat into the over-bored neck of the passage.

34. A method of assembling according to claim 29, wherein securing the portions includes brazing the filler ring to the throat of the forward liner and the over-bored neck of the passage and brazing the portions of the liners together.

35. A method of assembling according to claim 26, wherein bonding includes heating and applying pressure to the liners.

36. A method of assembling according to claim 26, further comprising sealing an upstream portion of the forward liner to the jacket and sealing a downstream portion of the aft liner to the jacket before bonding.

37. A combustion assembly for containing and directing combustion of a propellant, said combustion assembly comprising:
  a structural jacket having a passage including a first end, a second end and a neck, said neck positioned between and separating the first and second ends of the passage; and
  at least two liners including:
    a forward liner configured to fit within the first end of the passage and including a throat and a downstream portion wherein said throat is upstream of the downstream portion and wherein said throat defines a minimum inner diameter of the liner; and
    an aft liner configured to fit within the second end of the passage and including an upstream portion configured to abut the downstream portion of the forward liner so as to form a liner joint, wherein said liners cooperate when fit in and bonded to the structural jacket to form a longitudinal combustion chamber so that combustion of the propellant is contained and directed through the combustion chamber.

38. A combustion assembly for containing and directing combustion of a propellant, said combustion assembly comprising:

a structural jacket having a passage including a first end, a second end and a neck, said neck positioned between and separating the first and second ends of the passage;

a forward liner configured to fit within the first end of the passage, having defined on its outer surface a plurality of coolant channels and including a downstream portion; and an aft liner configured to fit within the second end of the passage, having defined on its outer surface a plurality of coolant channels and including an upstream portion configured to abut the downstream portion of the forward liner so as to form a liner joint, wherein said forward and aft liners cooperate when fit into the structural jacket to form a longitudinal combustion chamber so that combustion of the propellant is contained and directed through the combustion chamber from the forward liner to the aft liner.

39. A combustion apparatus according to claim 38, wherein the downstream portion of the forward liner includes a beveled portion and wherein the upstream portion of the aft liner includes a beveled portion, said beveled portions configured to abut each other in an overlapping relationship and form the liner joint.

40. A combustion chamber assembly according to claim 39, wherein the downstream portion of the forward liner includes a joining flange at least partially defining the beveled portion of the forward liner and wherein the upstream portion of the aft liner includes a joining flange at least partially defining the beveled portion of the aft liner.

41. A combustion assembly according to claim 40, wherein one of the joining flanges includes an alignment pin and the other one of the joining flanges defines an index hole configured to receive the alignment pin.

42. A combustion chamber assembly according to claim 41, wherein the index hole has a width that is equal to a diameter of the pin and the index hole has a depth at least as great as a length of the pin, said depth of the index hole allowing the flanges to come into full contact.

43. A combustion chamber assembly according to claim 42, wherein the alignment pin and index hole are positioned so that insertion of the pin into the hole aligns the coolant channels on each of the liners.

44. A combustion assembly for containing and directing combustion of a propellant, said combustion assembly comprising:

a structural jacket having a passage including a first end, a second end and a neck, said neck positioned between and separating the first and second ends of the passage; and a forward and aft liners configured to fit respectively within the first and second ends of the passage and one of the liners includes a throat defining a minimum inner diameter of the liners wherein said forward and aft liners cooperate when fit into the structural jacket to form a longitudinal combustion chamber so that combustion of the propellant is contained and directed through the combustion chamber from the forward liner to the aft liner and wherein said joint is positioned in a cooler region of combustion flow than the throat.

* * * * *